(12) United States Patent
Karch

(10) Patent No.: US 7,096,219 B1
(45) Date of Patent: Aug. 22, 2006

(54) METHOD AND APPARATUS FOR OPTIMIZING A DATA ACCESS CUSTOMER SERVICE SYSTEM

(75) Inventor: Robert Karch, Westfield, NJ (US)

(73) Assignee: Teleran Technologies, Inc., Fairfield, NJ (US)

( * ) Notice: Subject to any disclaimer, the term of this patent is extended or adjusted under 35 U.S.C. 154(b) by 0 days.

(21) Appl. No.: 09/571,879

(22) Filed: May 10, 2000

(51) Int. Cl.
*G06F 17/30* (2006.01)

(52) U.S. Cl. .............................. 707/9; 707/3

(58) Field of Classification Search .................... 707/1, 707/2, 3, 4, 6, 10, 9, 104.1, 102, 201; 345/740, 345/745, 747, 741; 709/203, 219, 224
See application file for complete search history.

(56) References Cited

U.S. PATENT DOCUMENTS

| | | | | |
|---|---|---|---|---|
| 5,058,008 A * | 10/1991 | Schumacher | .................... | 705/9 |
| 5,627,886 A * | 5/1997 | Bowman | .................... | 379/111 |
| 5,682,142 A * | 10/1997 | Loosmore et al. | ........ | 340/572.1 |
| 5,797,001 A * | 8/1998 | Augenbraun et al. | .......... | 707/9 |
| 5,907,602 A * | 5/1999 | Peel et al. | ............. | 379/114.14 |
| 5,987,454 A * | 11/1999 | Hobbs | ........................... | 707/4 |
| 6,035,332 A * | 3/2000 | Ingrassia et al. | ............. | 709/224 |
| 6,061,795 A * | 5/2000 | Dircks et al. | ................ | 713/201 |
| 6,286,043 B1 * | 9/2001 | Cuomo et al. | .............. | 709/223 |
| 6,311,194 B1 * | 10/2001 | Sheth et al. | ................. | 715/505 |
| 6,334,121 B1 * | 12/2001 | Primeaux et al. | .............. | 706/62 |
| 6,430,274 B1 * | 8/2002 | Winstead et al. | ....... | 379/114.14 |
| 6,519,571 B1 * | 2/2003 | Guheen et al. | ................ | 705/14 |
| 2001/0054155 A1 * | 12/2001 | Hagan et al. | ................ | 713/193 |
| 2002/0116389 A1 * | 8/2002 | Chen et al. | .............. | 707/103 R |
| 2002/0128981 A1 * | 9/2002 | Kawan et al. | ................. | 705/67 |

* cited by examiner

*Primary Examiner*—Leslie Wong
(74) *Attorney, Agent, or Firm*—Kaplan Gilman Gibson & Dernier LLP

(57) ABSTRACT

A method of detecting fraud and/or unauthorized database access and enhancing the efficiency of a data warehouse system by utilizing a usage profile of a user. The user profiles are generated from usage patterns, and the user profile is preferably utilized to both enforce security policies through detection of breaches and to improve user friendliness via customized portals that are constructed from the profiles.

8 Claims, 2 Drawing Sheets

METHOD AND APPARATUS FOR OPTIMIZING A DATA ACCESS CUSTOMER SERVICE SYSTEM

TECHNICAL FIELD

This invention relates to data access customer service, and more specifically, to an improved technique of optimizing efficiency, improving user-friendliness, and maximizing security in large data access systems.

BACKGROUND OF THE INVENTION

Data access is the input, update, deletion and retrieval of data in a computer system. It is often referred to as a query or a request. Data access customer service is a model of data access that treats the data center (Information Services/Systems) as a provider of goods (the data) and services (access to the data), and the data consumer (user) as a customer. The invention described herein can be applied to any data access system. It is however particularly useful when applied to a data warehouse environment.

Data warehousing refers generally to the maintenance, access and management of extremely large databases. Commercial environments in which such databases exist may include, for example, a large retail chain, which maintains a database of all products in inventory throughout all of its retail stores in the country. Large corporations may maintain databases with billions of records related to past and present employees, items sold, etc. In such commercial environments, databases may be accessed thousands or even millions of times per day. Tasks for which the database is utilized include report generation, responding to queries of various personnel, etc.

A major issue that arises in connection with the use of any data access system is performance. Performance relates to how quickly the users receive data they requested. There are many techniques utilized to improve the performance of queries. Basic techniques include indexing, partitioning and SQL optimizations (SQL is the language of data access in relational databases). These techniques focus on data management system metrics (i.e., system centric). Other techniques focus on how users are accessing the data (i.e., user centric). One such user centric technique is referred to as a 'Hot Response Cache' (HRC). The HRC improves the performance of queries by identifying "predictable and repeated information requests". This information is then retrieved ahead of time by the system and placed in an accessible cache. This cache is then searched by an application prior to sending a request to the database. If the data is found to be available in the cache it can be quickly presented to the user and the large database is never accessed. One of the problems with this solution is the application dependency. Each application that wants to use the cache must have prior knowledge of it and must provide appropriate security. This prevents the use of ad-hoc query tools (tools that allow a user to write and execute their own queries) and other third-party query generating tools that are commonly used to access data from a data warehouse. It also puts the burden of security in the application. Even if the application uses a centrally managed security table, enforcement of security policies must be duplicated across any applications that access the data. Since many applications are written by independent development organizations, this offers at best inconsistent, at worst incomplete implementations of security policy enforcement.

Even beyond the use of the HRC, security is a major issue that arises in connection with the use of data management systems. For example, it is important to insure that only the appropriate personnel are permitted to access sensitive records. Additionally, a separation of duty policy may be required to insure that certain transactions are only carried out with two different people. An example of such a transaction is the ordering of equipment, which ideally should require one person to authorize and a second person to pay for. Many systems include various techniques to insure that the separation of duties policy is enforced by requiring at least two people to participate in a transaction. An employee who wishes to fraudulently purchase items for his or her own personal use will have to conspire with a second employee to do the same, and thus, the chance of fraud is reduced. Security policies are commonly applied to the individual user and the users' role within the organization.

Another issue requiring attention in such large data warehousing systems is that of report scheduling and generation. Specifically, reports can often involve extremely lengthy database access to millions of records, and can easily consume a large amount of system resources. A brut force way of dealing with this problem is to simply schedule the reports during off hours. This is not the optimum solution since there may be certain reports that are time critical. Moreover, to the extent there are a large number of reports scheduled during off-hours, the off hours will become the very busy hours and the system will become overloaded at that time as well.

Still another major issue with accessing large data warehousing systems is the sheer size and complexity that makes it difficult for users to find and access the appropriate information for their needs. One current solution is the emergence of the enterprise information portal (EIP). EIPs provide a customized solution to the complexity problem. EIPs provide an integrated customizable interface to the information required by a user. The information is generally tailored to the user's role within the organization. While EIPs provide a reasonable solution to the complexity problem, they do not attempt to provide performance or security solutions. The user's role should correspond to the same role used by the security system, but will generally require separate maintenance. The profiles are used to customize the view a particular user has of the database, different profiles must be maintained to be used for intrusion detection or performance improvements.

There are a variety of database and non-database third party packages that attempt to crudely deal with each of the above issues as well as others. Most of these prior solutions have a variety of problems. First, there is no known solution that can deal with all of these problems in a convenient and user-friendly way and that maximizes the use of the database for all involved. Additionally, there is no known system for solving the problems of separation of duties, report generation, and query optimization in a manner that allows any technique to be used across multiple databases.

In view of the above, there exists a need in the art for a single comprehensive solution which will provide for optimized data warehousing management, security, access control, user-friendliness, and report generation.

SUMMARY OF THE INVENTION

The above and other problems of the prior art are overcome and a technical advance is achieved in accordance with the present invention. The database is modeled to create a site specific domain model. An artificial intelligence system includes segments related to a variety of data accessing issues, and each of the segments works with the others to solve virtually all of the above-described problems. Segments exist to improve system and individual request performance, provide security policy enforcement, recognize unnecessary overlapping database access, and to consolidate queries and reports to eliminate the need for same, administer and share role definitions, provide for guidance and simplification of access to information in a large complex environment. Under some circumstances, a new database is constructed to eliminate redundant processes, particularly in the case of identical or similar reports that are executed by different users. Under other circumstances aggregate tables are recommended and then created either by the system or the system administrator. In appropriate instances, queries are automatically rewritten to take advantage of these and other special efficiencies. For example, if a function $f$ is performed on a particular column x of the database by different queries, a separate column y equal to the value of $f(x)$ is generated to improve efficiency. Queries that perform the function $f(x)$ will be automatically rewritten to access the column y that contains the value off $f(x)$.

Additionally, user profiles are generated from usage patterns, and the user profile is preferably utilized to both enforce security policies through detection of breaches and to improve user friendliness via customized portals that are constructed from the profiles.

In addition to the above, meta-data and business rules are made available and utilized in order to improve system ease-of-use. Meta-data is 'data about data'. It is used to define the origin and meaning of data elements in a data access system. Business rules are 'rules about data'. They describe constraints and requirements on possible data values.

In a preferred embodiment, a proxy server is placed between the database and the client. The server presents a standard client interface, and is configurable, without reprogramming to operate across multiple different databases by including interfaces to numerous databases.

DETAILED DESCRIPTION OF THE PREFERRED EMBODIMENT

Figure 1:
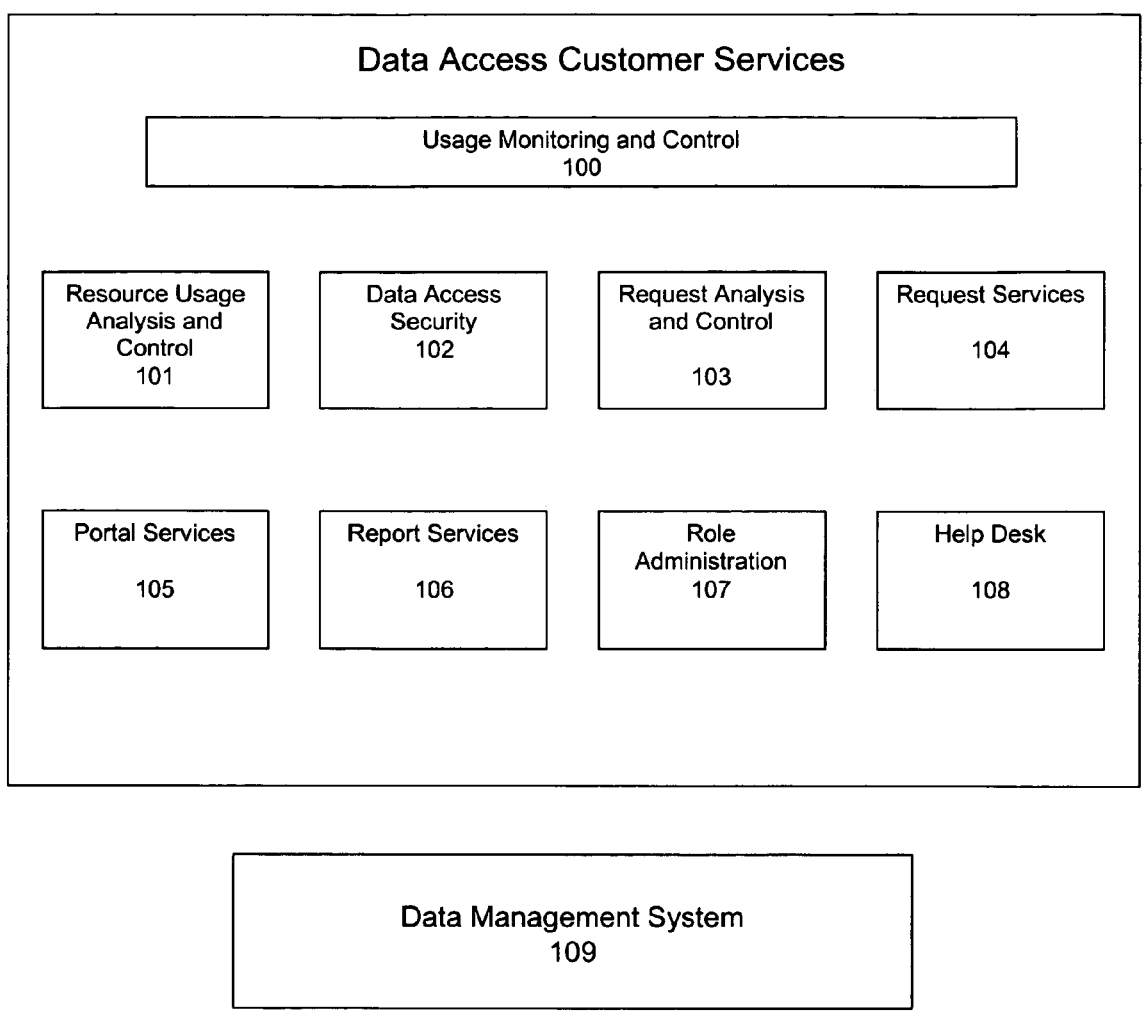
FIG. 1 is a conceptual diagram of a 'database access customer service system' in accordance with the present invention.
Figure 2:
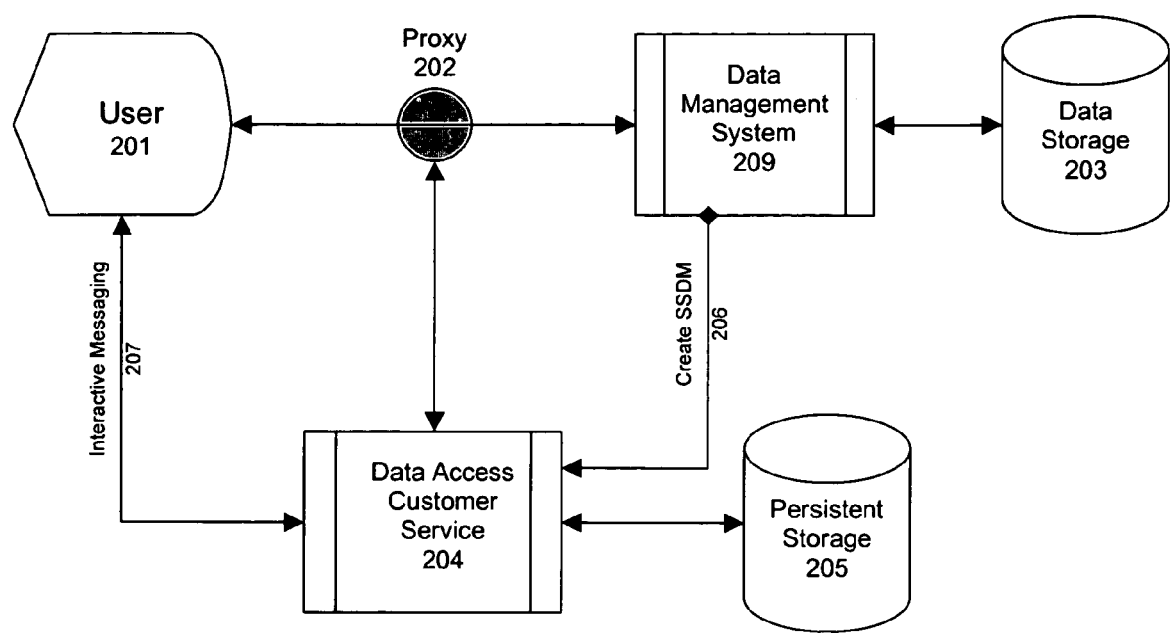
FIG. 2 illustrates the system configuration.

FIG. 1 depicts the basic functions of a data warehouse management system in accordance with the present invention. A plurality of segments 100–108 work together to provide a total database access customer service system. FIG. 2 depicts the configuration of the system relative to external entities.

The Usage Monitor and Control segment 100 monitors all the requests for data and data manipulation made by all users of the data access system. It also provides for implementing controls. These controls are specified in the form of rules. The Usage Monitor and Control segment is represented as a proxy 202 in FIG. 2, in that it acts as a replacement for the data access system listener or other connection facility. Usage monitoring requires some knowledge of the environment that it is monitoring. That knowledge is obtained by querying the data management system 209 for information about the objects it contains (i.e., tables, files, views etc.). The knowledge is stored as a model of the environment referred to as the Site Specific Domain Model (SSDM). The monitored information and the SSDM are maintained in persistent storage 205 for subsequent retrieval.

The Resource Usage Analysis and Control segment 101 provides reporting and analysis of the data management system resources and the ability to define rules that control access to the resources. The resources include data and procedure objects as well as metrics like CPU time, data storage space, disk I/O, time spent in the data management system, time spent fetching data from the data management system and amount of data accessed. This aspect of control is primarily for system performance and object availability rather than for security policy enforcement (described separately below). Reports answer the who, what, when, where and how (how much and how often) of object usage. Analysis provides recommendations made concerning performance enhancements such as the building of aggregate tables, the addition or removal of indexes and data partitioning. Recommendations may also be made for determining the size for data caching, data archiving, offline storage and data removal based on identifying what data is being accessed and what data is not or is seldom accessed.

Controls can be defined to prevent access to objects that may be under current maintenance or that may access objects that are. Analysis may also provide support for the creation of service level agreements (SLAs) that are reasonable, and provide the appropriate statistics to ensure that SLAs are met.

Regarding user-friendliness, Usage Analysis and Control recognizes and records usage patterns of particular users, or of any user in a particular role. Once recognized, the usage patterns can then be used to assist others who later are placed into the particular role, or can be used to customize the particular portal that a specific user is presented with. The patterns are termed usage profiles.

Additionally, the profiles can be used to detect intrusion to the database, in that a significant departure from the usage profile may indicate that a user is actually fraudulent. Preferably, the same usage pattern profile is used for assisting the user and others in that role, as well as for detecting intrusions.

With regard to optimizing database access and preventing the system from being overloaded, a feature of the invention includes a segment that recognizes multiple similar queries, and recommends consolidated queries. This will decrease the number of queries and database accesses required to provide all information requested by all involved in the various similar queries. Additionally, queries that generate a function of a particular field, such as a substring, are also converted into other queries that operate on a separate column that contains the value of the function applied to the particular field, instead of performing the function many times.

The entire system disclosed herein may be used across multiple databases to provide full services in all important areas such as (1) resource usage analysis and control, (2) data access security, (3) request analysis and control, (4) request services, (5) portal services, (6) report services, (7) role administration and (8) help desk services. The combination of all of theses important features leads to an optimized, user friendly data access customer service system. We take each in order below.

The Resource Usage Analysis and Control segment 101 generates information based upon analyzing the usage of the data by the data consumer (user). The usage analysis keeps track of usage of all database objects and recommends performance-enhancing tasks. One of these tasks is the creation of aggregate databases. Aggregates are recommended when multiple queries are generating the same statistic, thereby causing additional and unnecessary database access. For example, if several queries were independently compiling sales of any particular item during one month, then each of those queries would require access to all of the sales. Rather than have all of the different records reflecting sales accessed plural times, a separate aggregate database would be recommended. The aggregate database would include all of the summarized sales figures for the entire month, so that a separate compilation of these numbers is not required each time.

The generation of aggregate databases is known to those of skill in the art and examples of such systems have been published at 'The Data Warehouse Lifecycle Toolkit', R. Kimball et al. John Wiley & Sons, Inc (1998).

Another segment of the data access customer service system includes Data Access Security 102. The data access security provides security audits, enforces security policies, and detects and prevents intrusions and suspicious actions.

Security audits are a specialized form of reporting and analysis that looks for improper access and activity. These reports and analyses can be used to detect fraud. It is also used to document that proper policies are in place to ensure confidentiality and privacy of sensitive information.

Security policies enforce confidentiality requirements and help prevent fraudulent activity. Examples of security policies are the Chinese wall policy and separation of duty policies.

Intrusion detection is implemented at least in part by matching compiled user profiles to present access patterns. Specifically, the system maintains a user profile that it generates from monitoring usage patterns of each particular user. The system then maintains audit logs that indicate a user profile. The profile could specify that this user never accesses certain databases, or that certain databases are almost always, or always, accessed immediately after the particular user logs on. Thus, the system would know that when the Chief Financial Officer (CFO) logs on first thing in the morning, his usual habit is to look at the sales database immediately.

By maintaining user patterns, the system can then detect when those patterns are not followed during a particular log on. If a user logs on and does not access databases that he usually accesses, or does access databases that he does not usually access, this may represent a fraudulent log on (i.e., someone has stolen the user's password and logged on). The usage profile may be limited to certain days or times. For example, on certain days of the week, a particular user may usually check a particular database or run a particular query. In any event, as long as a particular user repeats a particular type of database transaction, that user profile can be used to detect and stop unauthorized access via these intrusions. The usage profile can also be used as an indicator that a user is doing something suspicious. For example if it is known that a certain user has given two weeks notice, and now their activity shifts from their normal profile, this may indicate that the user may be trying to steal information to take to the new job.

The system could intentionally delay the intruder, upon detecting a breach, by simulating a long response time. Also, the appropriate personnel may be automatically notified.

In an additional enhancement, the profiling can be maintained with respect to a particular role, or a particular group of users, rather than a single particular user. The remaining use of such profiles may be similar or identical to the use of such profiles for a single user. In an additional enhancement, a statistic may be assigned to intrusion detection. Specifically, the system could calculate a probability of fraud based upon breaches of user profiles, and then alert a supervisor or security officer. The authorized user may also be notified that there is a suspected intrusion occurring. If it is determined that it is an intrusion, the system can intentionally hold up or slow down results sent to the intruder (having the appearance of normal slow response time), giving the proper authorities time to find and catch the intruder in the act. Additionally, if it is determined that the use was not found to be fraud, then the profile may be modified to include such use as a part thereof. Thus, the intrusion detection is updated as it "learns" from experience.

A third segment Request Analysis and Control 103 utilizes artificial intelligence and/or an induction engine to perform request analysis and to control such requests. The request analysis 103 includes means for identifying and preventing poorly written requests. Poorly written requests are, for example, those that would result in excessive system resources being utilized. The system may learn as it operates which types of requests cause such overloading of the system, and may prevent same in the future. The system may also learn to estimate the approximate running time of a query. If it is known that database maintenance is to be performed at 11:00 pm and the query is submitted earlier at 9:00 pm and is estimated to run for more than 2 hours, it can be prevented from starting. It can be canceled, or it can be queued to run after the maintenance is complete. Details regarding a system for identifying and preventing long running or poorly written queries, and for creating the site specific domain model, are described in U.S. Pat. Nos. 5,899,991 and 5,875,440, assigned to the assignee of the present invention. Both mentioned patents are incorporated by reference.

Moreover, a request may be logged and audited as part of the analysis for knowledge transfer to others in a similar role. Meta-data can be used to translate requests written in SQL or some other query language into a more natural language in order to clarify the intent of the query. The arrangement also maintains a log of duplicate request submissions from different users for the purpose of optimizing performance by eliminating the different requests as previously described. In another enhancement the Request Analysis and Control segment can identify and prevent unauthorized views of data. This feature allows say a CFO to ensure that only one view (interpretation) of the accounting data is ever presented and prevent a display or report of the accounting data that may be misleading. Additionally, the request analysis can identify users in need of education by flagging queries that are inappropriate, (e.g., poorly constructed or contains syntax errors). Training materials are automatically forwarded to these users. For example, a user who commits a pre-determined number of syntax errors may be automatically sent a copy of the database language syntax by e-mail A fourth segment 104 includes Request Services. These services operate upon the requests to dynamically optimize performance and provide easier and better-managed access to data. One such request service includes query scheduling. Query scheduling means: If it is determined (by methods in 103) that a request is going to run a long time or use a large amount of resource, the system suggests that the request be scheduled at particular times. This in order to minimize the load on the system particularly during peak periods. Additionally, often times a plurality of different queries may be generating a particular function on a particular database column. Request analysis (103) might recommend that a special column be created that contains the value of the function applied to the requested column. A request services segment would automatically rewrite and redirect requests calling for the function on that column to the new column, which avoids duplication of the application of the function on the specified column. For example, consider a database column x which is operated on by 10 different queries, all of which calculate a particular substring of that database column. The substring function can be thought of as a specific example of a general function $f(x)$, which performs $f(x)$ on that column. Request analysis would make a recommendation that a new column y containing the value $f(x)$ be created.

The request services would be notified of this. Thereafter, future requests coming in attempting to perform that function on column x would then be automatically rewritten and redirected to the new column y, only being required to read the column rather than process it to perform the function. Additionally other query rewrite facilities are provided. These include query rewrite for the purpose of aggregate navigation and hot response cache described previously. The query may also be dynamically redirected to a backup or offline data management system, if the data has been temporarily or permanently relocated. Queries may be rewritten in order to improve query performance. There are various techniques known to those of skill in the art that allow a query to be rewritten to utilize special indexes or tell the query optimizer to use a better path, but which do not change the results of the query. A query may also be rewritten in order to comply with defined security policies. By rewriting the query rather than preventing it from executing, the user gets the information they are allowed to see without the need to change all their queries. Another rewrite function allows the user to write a more natural language query using meta-data that can be automatically translated into SQL or some other query language. Still another facility is the automatic application of business rules to queries.

An additional segment includes what we term herein Portal Services 105. The Portal Services also utilize the profiles, either on an individual, role, or group basis. However, the portal services have nothing to do with security. Rather, the portal services utilize a profile to improve user-friendliness. This access profile can be combined with a preferences profile that the Portal Services will maintain for a user or a role. The preferences inform the system of what objects the user is interested in prior to any user activity.

For example, if a user is accessing a particular database frequently, that will be reflected in the profile. Particular news events or other transactions involving that particular database will then be reported to that user promptly. Moreover, if a particular role is replaced (i.e., a new chief financial officer is hired), the profile can be displayed to the new CFO. In this manner, the new CFO, gains an understanding of the job function by looking at usage patterns of the old CFO. Additionally, the new CFO may have an option to request the user profile of the old CFO, or the system can automatically detect that the old CFO's log in has been deleted, and a new CFO has been entered into this system. The database software could then automatically educate the new CFO by providing information regarding usage patterns, which databases are typically checked, and what has changed recently in those databases. The use of meta-data services and knowledge transfer facility of the Request Analysis and Control segment 103 may assist in this process. By automatically noting when the position in a particular role has been changed, the system can become more user-friendly by providing automatic education through its customized portal services. The meta-data services provided in 103 can be augmented by customizable meta-data that is maintained by the Portal Services for users and roles. The meta-data services extend to individual queries where notes can be attached to specific requests to be recovered at a later time. These notes may be used to remind the user why they issued the query, or provide some form of categorization for the user to help them find the query again. Additionally these meta-data services can apply at the session level. All queries that are issued during the session are tagged with the same note. As the name 'portal' implies, this is an entryway to the data management system. The portal provides any interactive services provided by the system. The interface of choice is currently the WEB browser, but any user interface can be used. When a WEB browser is used, Portal Services will monitor 'click stream' statistics generated by the user. These statistics are maintained in persistent storage 205 and will be used as input to the Resource Usage Analysis and Control segment 101 and combined with the query data. 'Click stream' statistics generate their name from the mouse clicks used to select links from a WEB page. These statistics provide information on how a user is utilizing the interface. Knowledge of this activity combined with request activity gives the capability to provide better customer service to the data user. Another function of Portal Services is to provide easy access to the Help Desk segment 108 described below. Another service provided by the portal is access to a report library described below.

A segment 106 includes Report Services. These Report Services recognize duplicative reporting requirements from different entities. Additionally, the report services recognizes timing of the reports and recommends a smaller number of consolidated reports which may also be scheduled during off hours to maximize efficiency. If several reports are querying the database for similar information, the single consolidated report may be recommended. Consolidated reports may be stored at a central location for users to access, or may be automatically distributed to users via e-mail, e-mail links or some other form of notification.

With regard to report generation, overlaps in the database queries required for generation of various large reports are recognized automatically by the system. The system may then generate its own miniature database just for purposes of generating the particular reports. In accordance with such a technique, plural reports that may have required, for example, seven or eight accesses to the database may be accomplished with one access to a database and a plurality of accesses to a miniature database created for the sole purpose of report generation for the particular report. Whether the report itself is stored for subsequent retrieval or temporary databases are setup to hold report data, security policies must be enforced in the same manner as if the user were to access the data directly. The Data Access Security segment 102 performs this enforcement.

Another facility of the Report Services segment is to maintain a report library that can be used to select already existing reports. This is provided in conjunction with the Portal Services segment 105.

A Role Administration segment 107 maintains a log of different user roles for use by the other segments in doing data access security, and resource analysis. The roles may be changed and the members of each role, as well as the rights and privilege of each, may also be changed.

A Help Desk segment 108 exists to provide users with additional and more comprehensive assistance than Portal Services 105 provides. The Help Desk will contain an automated as well as a human component. The automated component will maintain a list of FAQs (Frequently Asked Questions). It will also allow for a dialog style interaction with an expert system component that guides users to an answer. In the event the automated system cannot answer the users questions, a human source will be notified of the users identification and question via e-mail, chat or other form of electronic communication. Another facility in the Help Desk segment is a help desk agent. The agent is responsible for live monitoring of a users interaction with the system and recognition of when a user appears to be confused, but may not know how to get help. The agent will aid the user in the use of the help desk.

The plurality of segments may be designed to present a standard interface to the user, or interactively communicate with the user 207 and itself, and interface with different data management systems. These systems include but are not limited to, file systems, relational database systems, federated database systems, multi-dimensional database systems, etc. This means that applications need not be rewritten each time the database system is changed. Rather, the data access system includes a user interface, which allows the user to specify which data management system is being utilized. The present invention then includes the software to interface with any and all such data management systems.

The system also recognizes the existence of other forms of access monitoring (e.g., almost all databases have their own tracing facilities). The system will accept input from other systems and will combine this information with its own. This for the purpose of centralized reporting and analysis.

While the above describes the preferred embodiment of the invention, various modifications or admissions will be apparent to those of skill in the art. Such modifications or additions are intended to be covered by the following claims.

What is claimed is:

1. A method of detecting fraud and/or unauthorized database access comprising the steps of:
   providing at least one database accessible by at least one user;
   maintaining a log of usage patterns of a particular user generated by monitoring said usage patterns of said user, said usage patterns including patterns of accessing a database by said user,
   if said usage patterns including patterns of accessing said database change to a specified degree, determining that an alert should be issued indicating possible fraudulent conduct, and recording same in an electronic memory, and
   wherein the specified degree includes not accessing a database within a predetermined time of logging in, which database is normally accessed within said predetermined time.

2. The method of claim 1 further comprising
using said log of usage patterns to generate a usage profile.

3. The method of claim 2 wherein
said usage profile is used to identify areas of knowledge in which a user is likely to be interested, and providing messages regarding said areas of knowledge to a user upon login.

4. The method of claim 1 wherein
said particular user is defined as any user in a particular role.

5. The method of claim 1 wherein
said particular user is any user in a particular group.

6. A method for enhancing the efficiency of a data warehouse system by utilizing a usage profile of a user, said method comprising:
   providing said data warehousing system comprising at least one type of database;
   generating said usage profile by monitoring usage patterns of said user, said usage patterns including patterns of accessing a database of said data warehousing system by said user,
   determining, from said usage profile, a first set of information to which said user should have access within said data warehousing system, and for sending said user said information automatically,
   determining, from said usage profile, a second set of information to which said user should not have access within said data warehousing system, and for reporting a security violation if said user accesses said second set of information and delaying a particular database query if it is determined that an inconsistent access is scheduled to occur within a predetermined time until after said inconsistent access.

7. The method of claim 6 wherein
said user represents everyone in a particular role.

8. The method of claim 7 wherein
said user represents a predetermined group of users.

* * * * *